United States Patent
Falabella et al.

(10) Patent No.: US 8,448,927 B1
(45) Date of Patent: May 28, 2013

(54) SHOCK ATTENUATION DEVICE AND METHOD

(75) Inventors: David Falabella, Merritt Island, FL (US); Eric E. Roach, Orlando, FL (US); Bhikhabhai L. Patel, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1014 days.

(21) Appl. No.: 12/236,990

(22) Filed: Sep. 24, 2008

(51) Int. Cl.
*F16F 15/00* (2006.01)

(52) U.S. Cl.
USPC . 267/140.11; 267/134; 267/136; 267/140.13; 267/140.4; 267/153; 188/198; 188/266.2; 188/268; 188/378; 188/379

(58) Field of Classification Search
USPC .......... 267/140.11, 136, 140.5; 188/378–379, 188/268
See application file for complete search history.

(56) References Cited

U.S. PATENT DOCUMENTS

| | | | | |
|---|---|---|---|---|
| 3,417,660 | A * | 12/1968 | Harbrecht | 89/198 |
| 4,011,929 | A * | 3/1977 | Jeram et al. | 188/268 |
| 6,364,039 | B1 * | 4/2002 | Majkovic | 175/320 |
| 2005/0253317 | A1 * | 11/2005 | Yasumoto et al. | 267/140.11 |

* cited by examiner

*Primary Examiner* — Robert A Siconolfi
*Assistant Examiner* — San Aung
(74) *Attorney, Agent, or Firm* — Withrow & Terranova, PLLC

(57) ABSTRACT

An item assembly and a shock attenuation method for protecting an item comprising providing an item internal to an assembly and encasing the item in a fluid material such that the material and the item are approximately in hydrostatic balance upon an impact event.

18 Claims, 5 Drawing Sheets

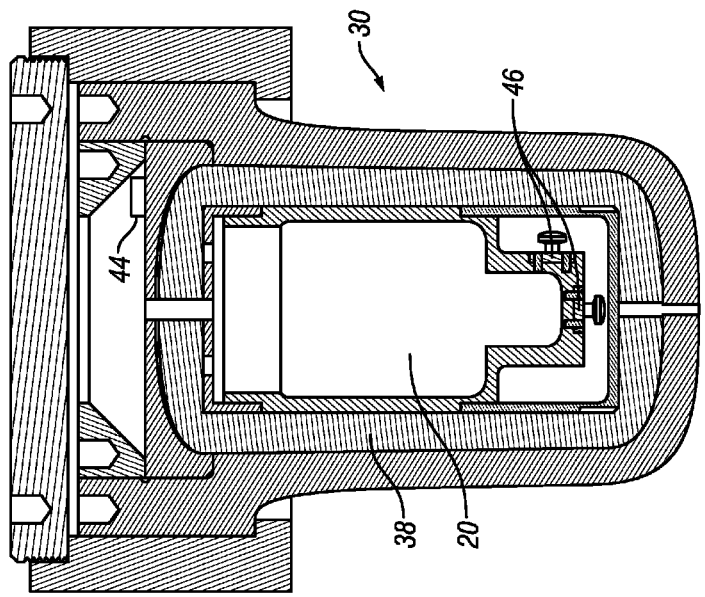
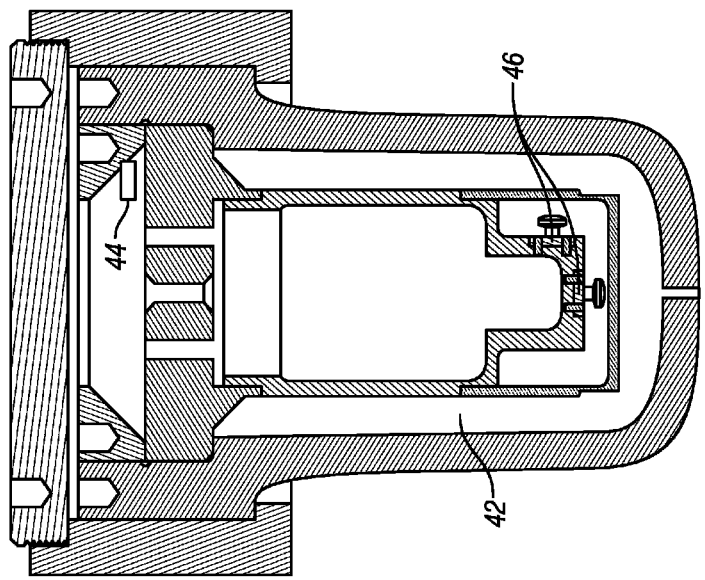

SHOCK ATTENUATION DEVICE AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to attenuation of shock, particularly for items undergoing high levels of acceleration or deceleration.

2. Description of Related Art

Items that undergo large accelerations or decelerations (gun launched projectiles, crash recorders, earth penetrating items, etc.) subject their internal components to a very severe shock environment while undergoing large, rigid body base accelerations/decelerations. For example, while the average acceleration of a projectile may be on the order of 5,000 G, high frequency shocks over 10 times this level are experienced by the internal components in all three axes due to the many higher order structural modes of the projectile assembly and non-homogeneity of the target impacted. The high shock attenuation method of the invention reduces these high frequency shocks, allowing lower cost, simpler, less shock hardened constriction of the internal system components to survive the launch or impact events.

Referring to FIG. 1 (left-hand side), if one attempts to employ traditional elastomeric or other compliant isolation system materials used to attenuate and absorb high frequency components of a shock, they will structurally fail or bottom out under the large average deceleration forces present during a sustained rigid body high g acceleration or deceleration event. Because of this, traditionally items that must survive both high shocks and high levels of acceleration/deceleration are rigidly mounted in the assembly (FIG. 2), transmitting all of the acceleration and high frequency shocks to the internal items.

In the present invention, the isolation material that surrounds the item to be protected has a density close to the item to be isolated, to limit these forces to stay within the stress/strain capabilities of the isolation material, as shown in FIG. 1 (right-hand side). An exemplary embodiment is to mix very fine tungsten powder into an elastomeric isolation material until its density is close to or equal to the isolated item density, or to alter its chemical composition to increase its density. This will in effect put the item in hydrostatic balance with the surrounding material, or "float" the item in the isolation material. This will reduce the higher frequency components of the penetration shock due to higher order modes in the item and mount assembly while transmitting most or all of the base rigid body motion. The thickness of the material on the sides, top, and bottom may also be varied to alter the system response in the different axes.

No one has used density tailoring of a dampening medium to keep strains within material limits, i.e., to keep the material from "squishing out" from around the item. The present invention prefers to have the dampening material density approximately equal the isolated item density, in essence "floating" the item in the dampening medium. Furthermore, no one has successfully attained 3D shock/vibration isolation; there has only been simple bumpers employed on the end of an item

BRIEF SUMMARY OF THE INVENTION

The present invention is of an item assembly and a shock attenuation method for protecting an item, comprising: providing an item internal to an assembly; and encasing the item in a fluid material such that the material and the item are approximately in hydrostatic balance upon an impact event. In the preferred embodiment, the material comprises an elastomer, and additionally comprises a metal mixed into the elastomer. Preferably the metal is powdered, and the metal is tungsten, lead, silver, gold, platinum, tin, or depleted uranium (most preferably tungsten). The material has a density approximately the same as the density of the item to be protected, preferably comprising about 10% powdered metal by volume (most preferably powdered tungsten). The material absorbs approximately 90% or more of the energy in a projectile impact event in the frequencies between approximately 500 Hz and 10 kHz.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 is a cut-away view of a prior art isolation device;

FIG. 3 is a cut-away view of a high shock isolation mounting of an item according to the invention;

DETAILED DESCRIPTION OF THE INVENTION

Figure 1:
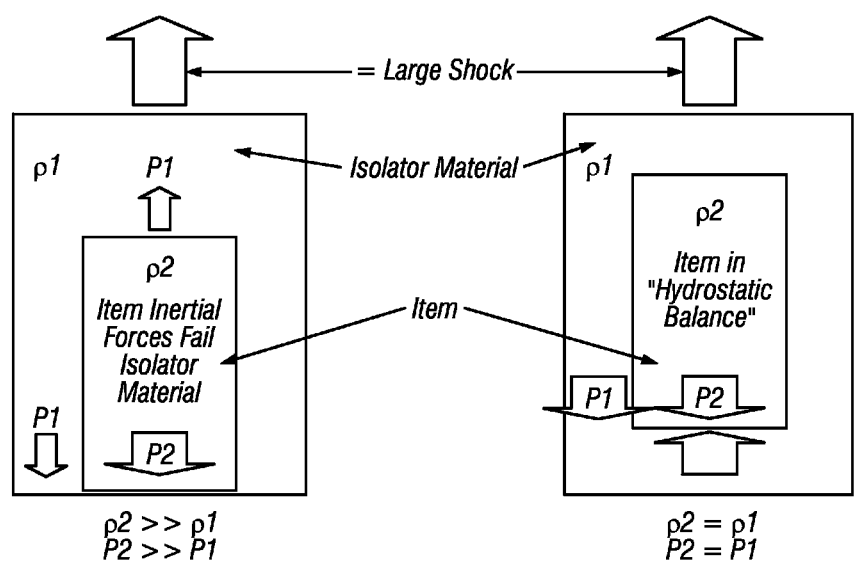
FIG. 1 illustrates the principles behind the invention in the context of inertial forces generated on an item during a large acceleration or deceleration with traditional isolation materials (left side), and with the density matched material (right side)

The present invention is of a shock isolation system design that significantly reduces the high frequency, high energy shocks to an item that are believed to be responsible for the majority of failures of electrical and mechanical components of items subjected to both large rigid body accelerations/decelerations and simultaneous high frequency shocks. This isolation system, sometimes referred to herein as SIT (Shock Isolating Technology), surrounds the item with a mechanically tailored material that solves the issues with previous attempts at surrounding the item with an isolation material, namely the forces involved during the deceleration causing the isolation material to structurally fail, resulting in item movement and subsequent failure. By "floating" the item in a housing filled with a material of tailored density as well as dampening properties, the item is isolated from high frequency shocks while limiting the loads on the compliant isolation material to its stress/strain capabilities.

In a SIT device 30 as shown in FIG. 3, the item 20 is surrounded by a mechanically tailored isolation material 38 (such as an elastomer/tungsten powder mix) that significantly reduces the high frequency shocks that would normally be transmitted and amplified by the traditional internal item/case interface chain illustrated in FIG. 2. The item and isolation material are fabricated such that, upon an impact event, the item and the isolation material are approximately in hydrostatic balance, i.e., they are approximately in hydrostatic equilibrium. The inertial forces attempting to push the isolated item through the surrounding SIT material are balanced and opposed by the SIT inertial forces generating pressure in the compliant material that are counteracting the item inertial forces due to the SIT material having close to the same density as the item being isolated.

Further advantages of the present invention include: (1) significant attenuation of high frequency, repetitive shocks to the item; (2) allowance for a less exotically constructed, lower cost item with increased reliability; (3) allowance of items that are currently hardened to survive high accelerations and shocks to survive even higher speed launches/impacts into harder material or higher speed crashes.

Preferably, with the isolation material one matches the density of the item (e.g., about 0.1 lb/in$^3$) via loading of powdered metal into the elastomeric material (e.g., about 10% W by volume). One can reduce (or increase) loading to allow a certain maximum stress/strain that the isolator material can handle. Preferred elastomeric materials include various silicon or flouro-silicone rubbers, urethanes, or other compliant elastomeric materials that will allow the suspension of fine particles of a densification material, though silicone elastomers are preferred due to their ability to maintain their compliance over a wide temperature range. Metals other than W that are believed to work adequately for loading the elastomeric material include tungsten, lead, silver, gold, platinum, tin, depleted uranium, or any other heavy element, oxide, or alloy that can be made into fine particles. In addition, fine particles of granite/dense rock or ceramic could also be used. Tungsten is preferred due its high density that allows a minimum volume of material to be added to achieve the desired density, thus allowing for the maximum amount of compliant/dampening material in the SIT, providing the best high frequency shock attenuation performance.

Figure 4:
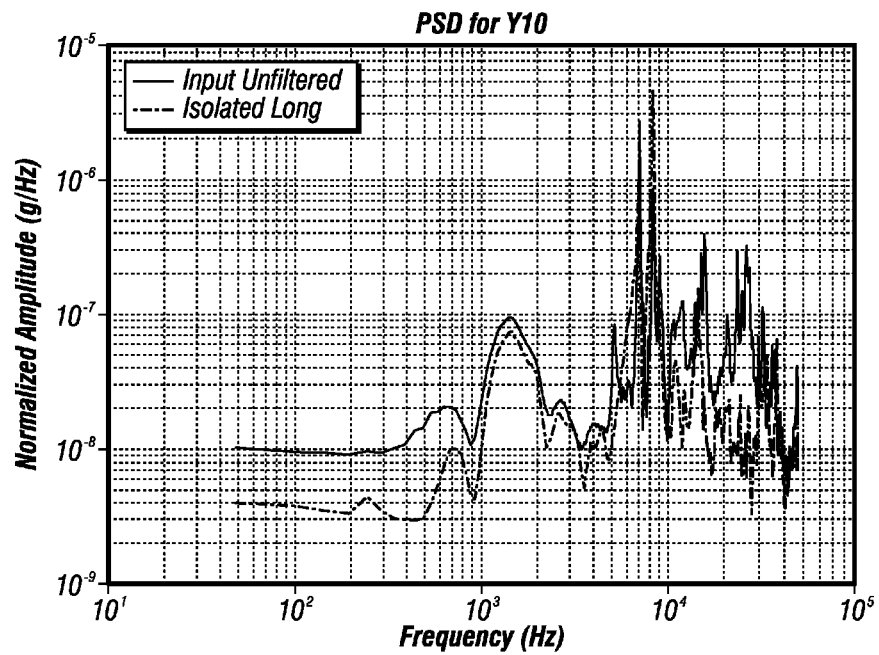
FIG. 4 is a graph of the longitudinal PSD response of the prior art mounting of FIG. 2 when tested.
Figure 5:
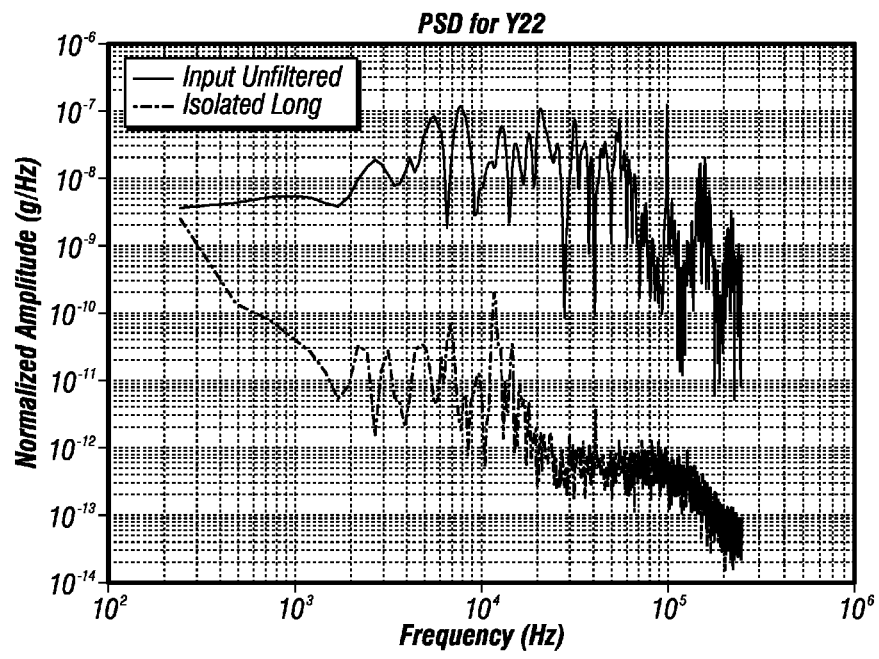
FIG. 5 is a graph of the PSD response of the mounting of the invention of FIG. 3 when tested.
Figure 6:
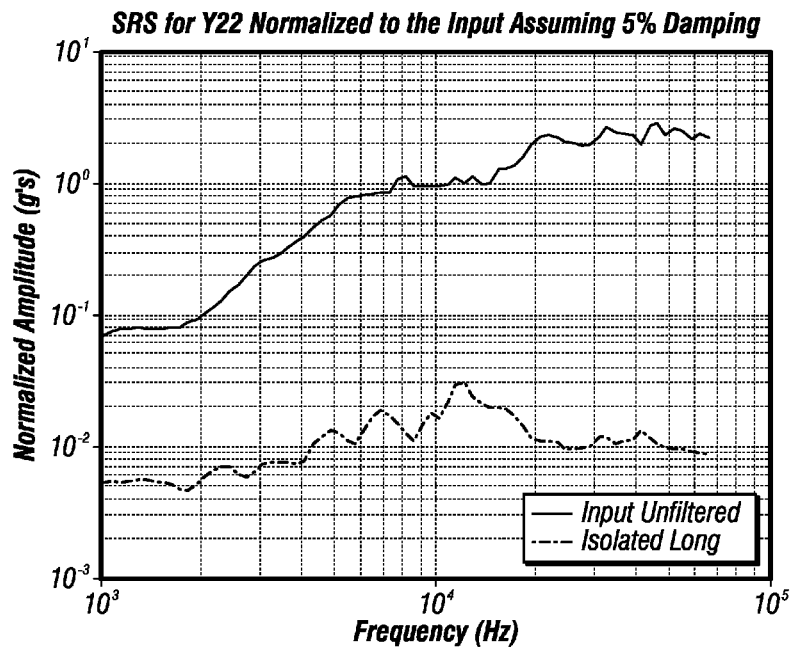
FIG. 6 is a graph of the Shock Response Spectrum (SRS) response of the mounting of the invention of FIG. 3 when tested.

Laboratory tests were performed to test the invention. FIG. 2 shows a traditional flange hard mount (with air gap 42) item used to test the baseline prior art devices, and FIG. 3 shows a device according to the invention used for testing. Input accelerometers 44 and 3-axis output accelerometers 46 were employed in testing. FIG. 4 shows the longitudinal response of the baseline flange hard mount item, showing an approximately 1-to-1 response from 1-10 Khz, the frequencies of primary interest. FIG. 5 compares the PSD of the prior art and inventive devices undergoing a 29K G peak shock with hammer. A greater than 20 dB reduction occurs with the invention in the 500 Hz to 10 KHz region of interest. SRS data from the same test are plotted in FIG. 6.

Figure 7:
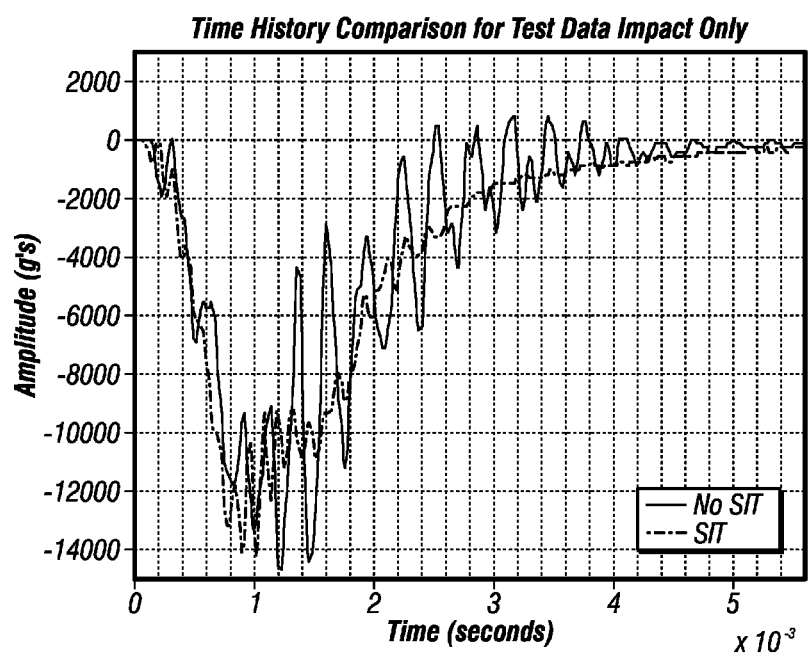
FIG. 7 is a plot of test data showing typical G forces and shock generated on an item during an actual impact event with a traditional "hard mount" within the assembly (FIG. 2), compared to the same item isolated by surrounding it with the invention (FIG. 3)
Figure 8:
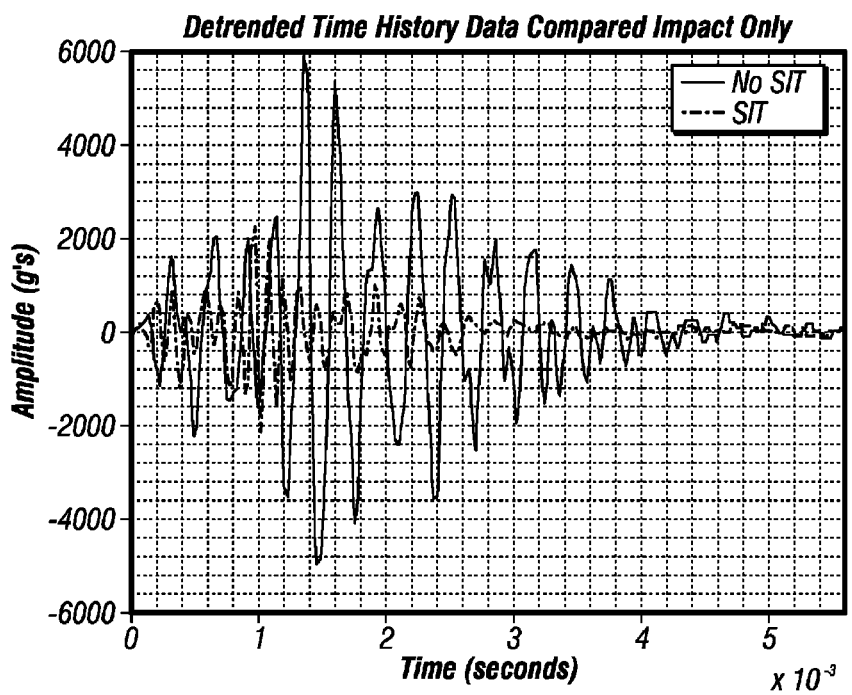
FIG. 8 is a similar graph with base deceleration from impact removed.
Figure 9:
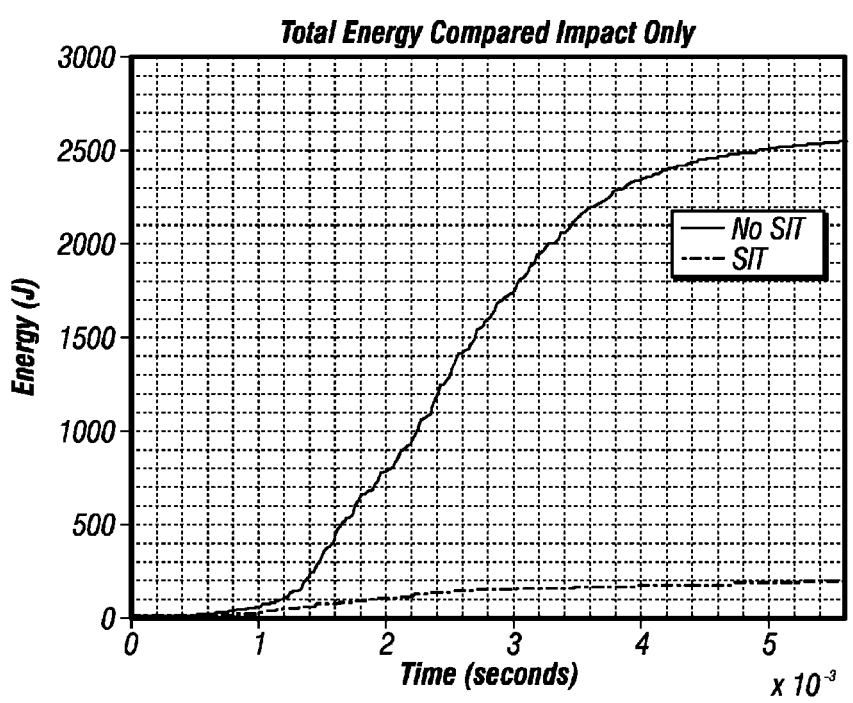
FIG. 9 is a graph of shock energy reduction to the item with the invention per the tests.

Field tests were also conducted. The devices tested in the laboratory were loaded aboard standard projectile-shaped test bodies (about 6.7" diameter, 20.3" length, and 90 lb weight). The prior art device impacted at 763 fps, and the inventive device at 770 fps. FIG. 7 shows the attenuation by the invention of high-frequency shocks by about 3-5×. FIG. 8 shows that high frequency acceleration was reduced greatly, with total energy involved of ½ mv$^2$. FIG. 9 shows results after integrating acceleration to get velocity, taking ½ mv$^2$, then summing over time, which shows a greater than 10× reduction in cumulative energy to the item. Accordingly, the present invention absorbed 90% of the high-frequency, component-damaging energy from the device impact.

While the preferred embodiment of the invention is directed to military applications, the invention is also useful in any environment in which shock needs to be attenuated. As an example, the hydrocarbon extraction industry needs instrumentation that can survive the extreme shock and vibration environment of the drill bit area. As another example, the aircraft industry needs quality protection for crash data recorders.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A shock attenuation method for protecting an item, the method comprising the steps of:
    providing an item internal to an assembly; and
    encasing the item completely in an elastomeric material, wherein the elastomeric material has a density approximately the same as the density of the item.

2. The method of claim 1 the elastomeric material comprises one of a silicon and a flouro-silicon elastomer.

3. The method of claim 2 wherein the elastomeric material additionally comprises a metal mixed into the elastomeric material.

4. The method of claim 3 wherein the metal is powdered.

5. The method of claim 4 wherein the metal is selected from the group consisting of tungsten, lead, silver, gold, platinum, tin, and depleted uranium.

6. The method of claim 5 wherein the metal is tungsten.

7. The method of claim 4 wherein the elastomeric material comprises about 10% powdered metal by volume.

8. The method of claim 7 wherein the metal is tungsten.

9. The method of claim 1 wherein the elastomeric material absorbs approximately 90% or more of the energy in a projectile impact event in the frequencies between approximately 500 Hz and 10 kHz.

10. An item assembly comprising an item completely encased in an elastomeric material, wherein said elastomeric material has a density approximately the same as the density of said item.

11. The item assembly of claim 10 wherein said elastomeric material comprises one of a silicon and a flouro-silicon elastomer.

12. The item assembly of claim 11 wherein said material additionally comprises a metal mixed into the elastomeric material.

13. The item assembly of claim 12 wherein said metal is powdered.

14. The item assembly of claim 13 wherein said metal is selected from the group consisting of tungsten, lead, silver, gold, platinum, tin, and depleted uranium.

15. The item assembly of claim 14 wherein said metal is tungsten.

16. The item assembly of claim 13 wherein said elastomeric material absorbs approximately 90% or more.

17. The item assembly of claim 16 wherein said metal is tungsten.

18. The item assembly of claim 10 wherein said elastomeric material comprises about 10% powdered metal by volume of the energy in a projectile impact event in the frequencies between approximately 500 Hz and 10 kHz.

* * * * *

UNITED STATES PATENT AND TRADEMARK OFFICE
CERTIFICATE OF CORRECTION

PATENT NO.         : 8,448,927 B1                                    Page 1 of 1
APPLICATION NO.    : 12/236990
DATED              : May 28, 2013
INVENTOR(S)        : Falabella et al.

It is certified that error appears in the above-identified patent and that said Letters Patent is hereby corrected as shown below:

In the Claims

Column 4, line 55, in claim 4, replace

"claim 1 the elastomeric material comprises" with --"claim 1 wherein the elastomeric material comprises"--.

Column 5, lines 22-23, in claim 16, replace

"absorbs approximately 90% or more" with --"comprises about 10% powdered metal by volume"--.

Column 5, lines 26-29, in claim 18, replace

"18. The item assembly of claim 10 wherein said elastomeric material comprises about 10% powdered metal by volume of the energy in a projectile impact event in the frequencies between approximately 500 Hz and 10 kHz" with --"18. The item assembly of claim 10 wherein said elastomeric material absorbs approximately 90% or more of the energy in a projectile impact event in the frequencies between approximately 500 Hz and 10 kHz"--.

Signed and Sealed this
Eleventh Day of March, 2014

Michelle K. Lee
*Deputy Director of the United States Patent and Trademark Office*